United States Patent [19]
Gröndahl

[11] Patent Number: 4,910,851
[45] Date of Patent: Mar. 27, 1990

[54] DEVICE IN A CLAMPING MACHINE

[76] Inventor: Sven A. Gröndahl, Torsgatan 43, 43, S-113 37 Stockholm, Sweden

[21] Appl. No.: 238,340
[22] PCT Filed: Feb. 27, 1987
[86] PCT No.: PCT/SE87/00096
§ 371 Date: Aug. 29, 1988
§ 102(e) Date: Aug. 29, 1988
[87] PCT Pub. No.: WO87/05250
PCT Pub. Date: Sep. 11, 1987

[30] Foreign Application Priority Data

Mar. 4, 1986 [SE] Sweden ............................... 8600976

[51] Int. Cl.[4] ............................................. B23P 11/00
[52] U.S. Cl. .................................................. 29/243.5
[58] Field of Search .................... 29/33 K, 33.5, 33.52, 29/34 R, 432.1, 509, 566, 565, 243.57, 243.5, 243.58; 72/356; 10/11 A

[56] References Cited

U.S. PATENT DOCUMENTS

| | | | |
|---|---|---|---|
| 4,035,901 | 7/1977 | Lux et al. | 29/243.5 |
| 4,607,418 | 8/1986 | Hafner | 29/243.5 |
| 4,726,107 | 2/1988 | Knudson | 29/243.5 |

*Primary Examiner*—Robert C. Watson
*Attorney, Agent, or Firm*—Sughrue, Mion, Zinn, Macpeak & Seas

[57] ABSTRACT

A machine joins edge stiffening means (2), longitudinal and transverse spring wires (6, 6') of a spiral spring cushion (1), e.g. a car seat. A machine table supports the cushion, clamping heads (37) cut off a blank from a strip (38) and bend it around edge stiffening means and wires. A clamping head reciprocating puncher is located outside the cushion and has a cutting edge (48) and a bending die (52) with a groove (47) for receiving the blank, edge stiffening means a wire (6). A dolly part (39) cooperating with the puncher (40) is devised for cutting off a clamping blank and to form a clamp around edge stiffening means and wire (6) when bringing the clamping puncher in contact with the dolly die. The dolly die is shaped such that a portion carrying a groove (46) for clamping blank, edge stiffening means and wire in operative position for clamping projects upwards above the surface of the machine table (20) while said portion in its inactive position is located below said surface to render possible displacement (19) of the cushion in the direction of the edge stiffening means without any obstruction from transversely extending wires.

23 Claims, 12 Drawing Sheets

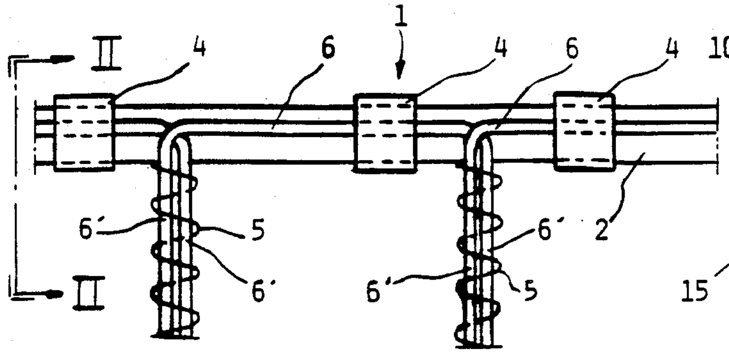
Fig.1
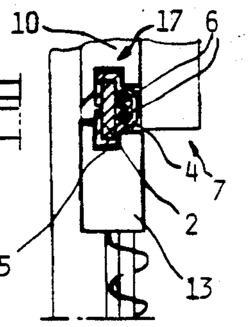
Fig. 2
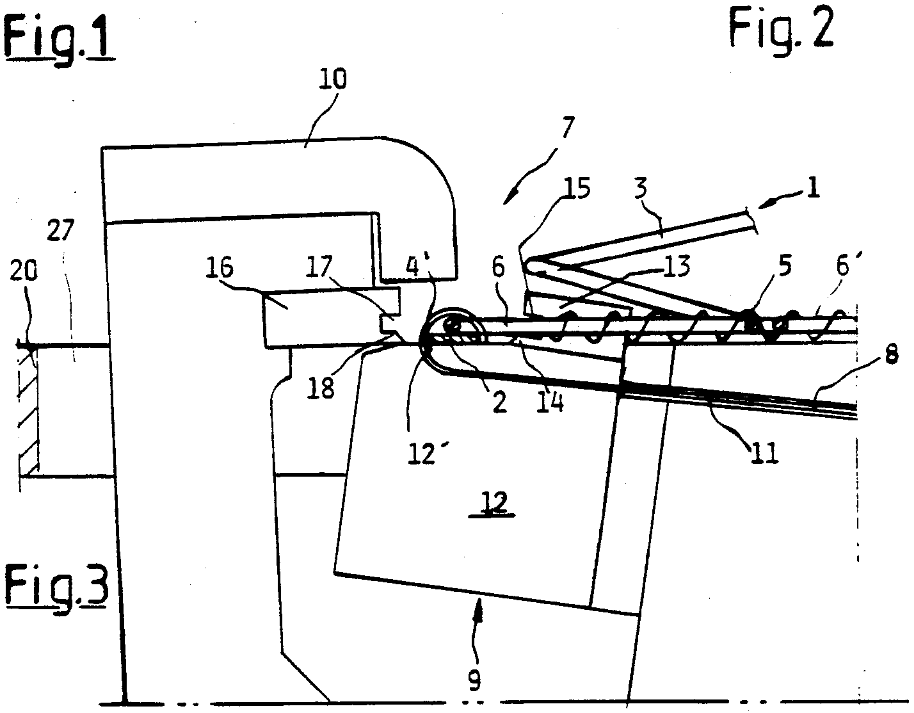
Fig.3
Fig. 4
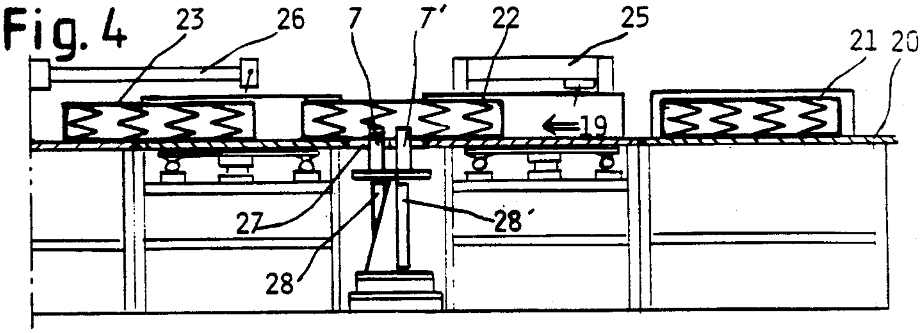

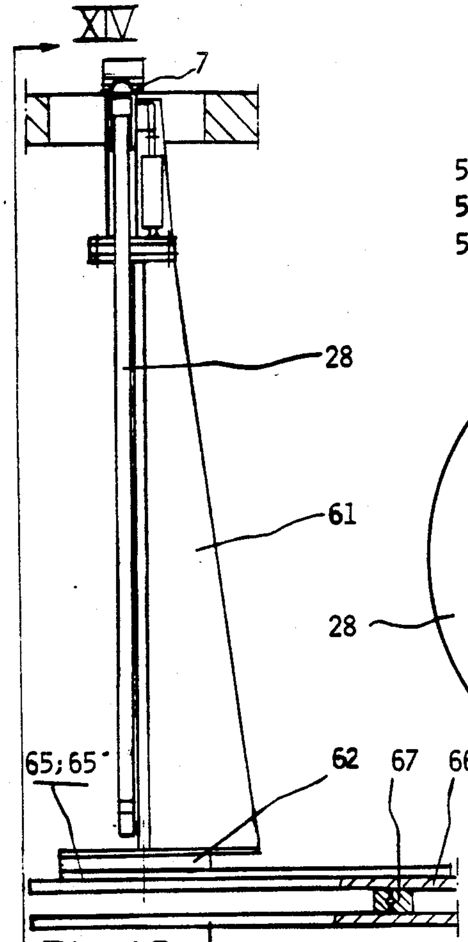
Fig.13
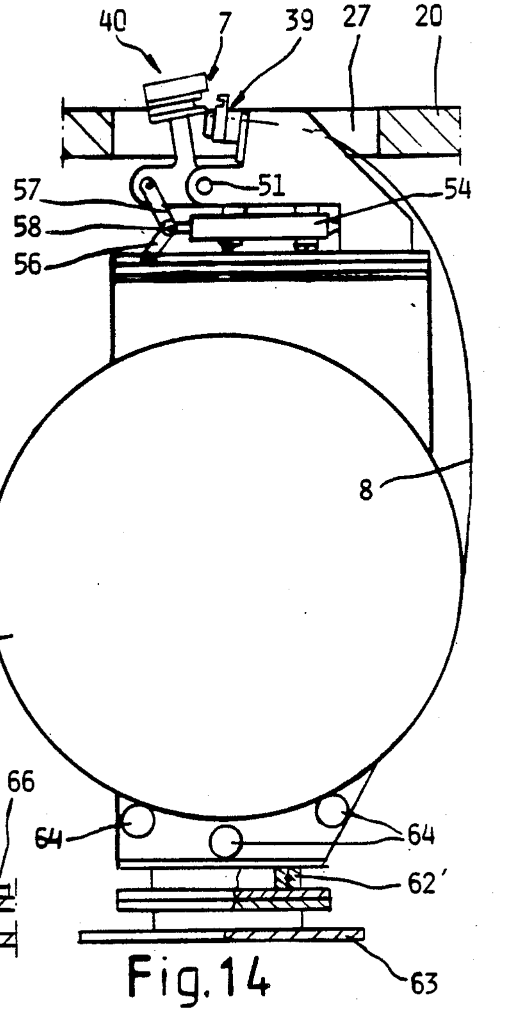
Fig.14
Fig.15
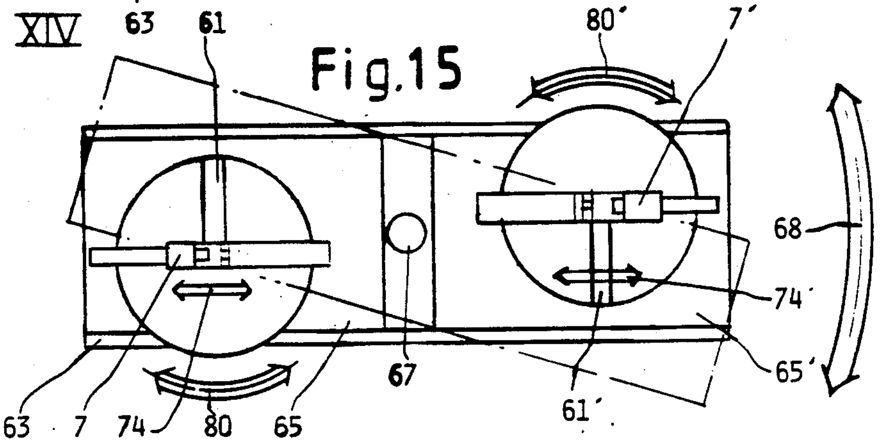

Fig. 16
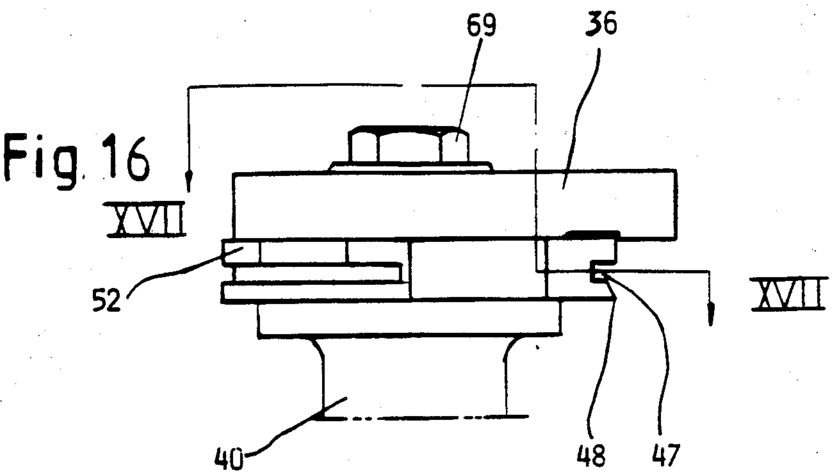
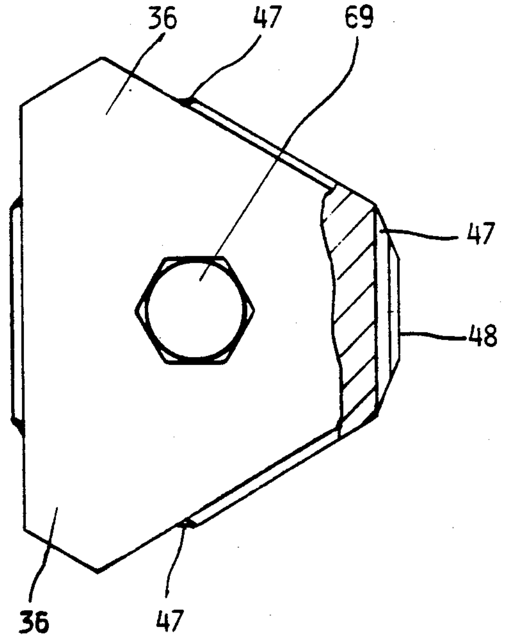
Fig 17

DEVICE IN A CLAMPING MACHINE

BACKGROUND OF THE INVENTION

The present invention relates to a device in a clamping machine intended for clamping of spring cushion destined for beds, quilts, seats and backs for car seats etc. The spring cushion comprise springs, preferably of screw-shape, which are manufactured of spring wire having circular, square or other section and which are distributed over the whole spring cushion. Extending along the lower edges of the spring cushion is a stiffening member, in most cases in the shape of a metal tape or a flat iron, for example with the dimensions 10×1 mm or 6×1 mm. The stiffening means defines the contour of the spring cushion and its form in the plane of the spring cushion, e.g. the vertical projection of a seat cushion, by fixing through a clamping operation the lower spring wires extending along the edge to the stiffening member. Extending between the spring cushion stiffening means are transversal spring wires, of which a part extends along the stiffening means and is secured to them by means of clamps.

A machine for clamping spring cushions consists of a plane, horizontal machine table on which the spring cushion rests, and one or more clamping heads disposed along the edges, which heads are fed with clamping strips from a bobbin. The clamping head cuts off a piece of the clamping strip and bends it to a clamp which connects the stiffening means of the spring cushion with spring wires along that edge of the spring cushion which rests on the table. When this side is finished, the spring cushion is reversed entirely, whereupon the stiffening means on the opposite side in a corresponding manner is clamped firmly to the wires.

The clamping head consists of an abutment or dolly part connected with the table and presenting an abutment or dolly groove extending in the longitudinal direction of the stiffening means into which one or more springs of the spring cushion can be introduced to be secured together by means of a clamp. This fixed dolly part is located on the interior side of the edge stiffening means of the spring cushion. Disposed on the exterior side of the stiffening means is a movable attachment head, which presents a longitudinal groove shaped so as to be capable together with the groove of the dolly part to receive and retain the stiffening member and the wires to be clamped together. The attachment head is equipped also with a cutting blade which is in cooperation with a cutting edge for severing a bit of the clamp strip, which thereupon is bent and riveted around the edge stiffening member and the wires. The frame is displaced in the longitudinal direction of the stiffening member and clamps are applied along the stiffening member in desired spacing for joining stiffening members and wires.

The part of the head connected with the table must project upwards above the surface of the table in order to be capable of taking up into its groove the inner part of the stiffening means. This implies that when the frame is displaced in its longitudinal direction the transversal wires cannot pass past the fixed part unless the frame has been raised from the table and over the dolly. The movable part of the head situated on the outer side of the frame can protrude over the surface of the table without constituting any obstacle against displacement of the frame in the direction of the stiffening member.

When using clamping machines with fixed clamping head an automatization of the clamping operation for frames is rendered difficult and even almost impossible. This holds true to a very high degree for frames with irregular contour such as, for example, frames for back seats in cars with interior curvatures for wheel housings, rounded front corners etc.

In known clamping machines the material strip for the clamp is fed through a feeding groove and at the end of the feeding groove there is provided that cutting die which cooperates with the movable part. The construction is shaped so that a redressing of the die is complicated, for instance because the cutting die must be removed for grinding. When using clamping material having varying dimensions, an exchange must be made of parts for the feeding grooves, cutting and feeding devices. Thus must, for example, when working with varying dimensions of the strip or the wires the bending dies always be exchanged.

SUMMARY OF THE INVENTION

The object of the present invention is to eliminate the aforementioned drawbacks and to provide a clamping machine which simplifies and facilitates manual clamping and which also renders possible to accomplish automatic clamping machines. In addition, a number of further advantages is obtained by the invention thereby that the clamping head has a reciprocating clamping puncher located outside of the spring cushion and comprising a cutting edge and a bending die with at least one groove for receiving clamping strip blank material, edge stiffening means and wire, besides of which the dolly portion cooperating with the reciprocating puncher comprises a clamping die cooperating with the cutting edge of the puncher, a dolly die with at least one groove for receiving clamping strip blank material, edge stiffening means and wire, devised for cooperation with corresponding grooves on the clamping puncher to cut off a clamping blank piece and to form a clamp around the edge stiffening means and the wire when bringing the reciprocating puncher together with the dolly die, and a clamping strip guider devised to carry the clamping strip from a storage bobbin to the edge of the cutting die, in addition to which the dolly die is shaped so as that portion which is provided with the groove for taking up the clamping strip material, edge stiffening means and wire in operative position for the clamping, projects upwards above the surface of the machine table, while said portion in its position of inactivity is located below the surface of the table in order to render possible displacement of the spring frame in the direction of the edge stiffening means without any obstacle by the transversally extending wires of the spring cushion. In an embodiment of the invention the reciprocating clamping puncher comprises a clamping arm adapted to pivot on a horizontal axle and at its other free end to carry the clamping die, the pivoting movement of the clamping arm being accomplished by a two-link toggle mechanism the common hinge of the two links being actuated by a reciprocating power means, e.g. a fluid pressure cylinder, whereas the other respective ends of the two toggle links are pivotably carried by the machine table body and by a pivot pin attached to the clamping arm at some distance from said horizontal axle such that the clamping arm performs a complete operating cycle at a one-way full stroke of the reciprocating power means.

In an other embodiment the dolly die is constituted by a horizontal stopping disc rotatable about an axle positioned perpendicularly to the clamping arm.

In a third embodiment the stopping disc has a triangular shape with rounded corner portions and bending grooves which are formed in the corner portions and extend perpendicularly to the radius from the rotation axle of the stopping disc.

In a fourth embodiment at least the front portion of the clamping strip guider is formed as a round pivot which constitutes a bearing for the rotational movement of the stopping disc.

In a fifth embodiment the clamping strip guider has a radial guiding groove with smoothly rounded bottom and a bottom filling part cooperating with the groove and formed so that a duct is shaped in the clamping strip guider for advancing the clamping strip to the cutting die for forming and cutting a clamping blank.

In a sixth embodiment the cutting die is shaped as a ring turnable around the front portion of the clamping strip guider and having at least one cutting die located at the periphery of said ring.

In a seventh embodiment the cutting die has at least one even portion parallel to its axis of rotation, a so-called "flat,levelled" surface for cooperation with a straight edge on the arm of the clamping head.

In an eighth embodiment the stopping disc is rigidly connected with a carrier arm by means of which the stopping disc is rotatable between a position of operation and a position of rest, preferably by means of a power means, such as a power cylinder.

In a ninth embodiment the bending die of the clamping arm has the shape of a ring rotatable about an axle extending perpendicularly to the pivot axis of the clamping arm, one or more grooves being provided along the periphery of the ring for cooperation with corresponding grooves on the dolly unit for producing a clamp.

In a tenth embodiment the grooves of the rotatable stopping disc and the grooves of the rotatable bending die have different dimensions, but are formed so as to be equal in pairs for rendering a clamping operation possible.

In an eleventh embodiment the clamping head as a whole is turnable together with the winding bobbin for the clamping strip about a vertical axle for adaption to oblique edges of the longitudinal sides of the spring frame.

In a twelfth embodiment two clamping heads are disposed individually rotatable at one end of a balance arm which is swingable about an axle located between the clamping heads and parallelly with the axles of rotation of the clamping heads.

In a thirteenth embodiment the hinges for the swinging movements of the clamping heads are fixed each on its own holding disc which in turn is displaceable radially along the balance arm relatively to the hinge for the swinging movement of the balance arm.

In a fourteenth embodiment the dolly unit includes a strip guider with a front portion to which a turnable cutting die and a rotatable cutting die and a rotatable forming head are firmly attachable by means of a bolt.

In a fifteenth embodiment the cutting die and the forming head are devised for in cooperation to form a number of guiding grooves along the periphery for clamping strips of different dimensions.

In a sixteenth embodiment the guiding grooves at their opening have circular bending grooves with differing radii.

In a seventeenth embodiment the toggle link end pivot is joined with a spring biased plunger enclosed in a housing fixed to the machine table body such that the link end is allowed to move into the spring housing unit should the clamping arm be blocked, thereby avoiding destruction of the clamping mechanism.

In an eighteenth embodiment the reciprocating clamping plunger comprises a cutting die fixed to a reciprocating support displacably carried by a housing and actuated by a hydraulic piston in a cylinder bore with a piston driven by a pneumatic cylinder such that a stroke of the cylinder will press the plunger forward to cut off a strip blank and to form a clamp.

In a nineteenth embodiment there is a set plunger at the end of the cylinder bore for the hydraulic piston of the reciprocating support the set plunger being axially displacable in order to set the starting position of the working stroke.

In a twentieth embodiment the housing of the reciprocating support is adjustable transversely to the cutting edge motion in order to adjust the cutting nip of the edge.

In a twentyfirst embodiment the reciprocating support has a T-shaped head adopted and guided by a related undercut slot in the piston of the reciprocating support.

In a further embodiment a reversing valve for the pneumatic power means, such as a pneumatic cylinder, is controlled by a spring biased piston and cam unit actuated by the hydralic pressure acting on the piston of the reciprocating support such that the cam will operate the reversing valve when a predetermined hydraulic pressure is at hand in the cylinder of the reciprocating support, causing the power means to reverse very quickly.

BRIEF DESCRIPTION OF THE DRAWINGS

The invention shall be described nearer with reference to the attached drawings, wherein FIG. 1 shows the lower edge of a spring frame with edge stiffening means, spring wires and clamps, FIG. 2 is a view, partly in section, following the line II—II in FIG. 1, FIG. 3 shows a clamping head with a dolly unit, a clamping arm as well as the lower edge of a spring frame, FIG. 4 is a diagrammatic sketch of a conveyor way and a machine for the clamping of spring frames, FIG. 13 is a diagrammatic view of a stand with a clamping head, FIG. 14 shows the stand of FIG. 13 in a side view, FIG. 15 is a top view which diagrammatically shows the two clamping units of the FIGS. 6–8, FIG. 16 is a side view of the end of a clamping arm, FIG. 17 is a top view of the arm of FIG. 16.

DESCRIPTION OF THE PREFERRED EMBODIMENTS

Figure 5:
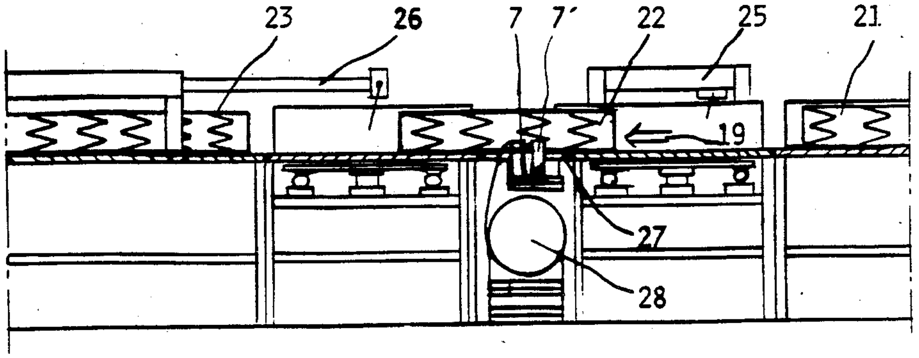
FIG. 5 shows the same machine as FIG. 4.

FIG. 1 shows the lower edge of a spring frame 1 viewed from above. Located in the lower edge of the spring frame is an edge stiffening means or bar 2, which is made of a flat iron which follows the contour of the spring frame. The spring wires 3, which form spring spirals in the pad are drawn forwards to the edge stiffening means 2, above which the spring wires 3 have straight portions 6, at the ends of which the wire 6′ is bent inwards rectangularly towards the spring frame. The spring spirals and the spring wires are at different places fastened together with collecting springs 5 for fixing the position of the spring spirals within the spring frame. For imparting a stable form to the spring frame those spring wires 6 which rest on the edge stiffening means 2 are fixed with clamps 4 which consist of a blank cut off from a clamping strip and thereafter bent around the edge stiffening means 2 and one or more spring wires 6.

FIG. 2 shows how the clamp 4 is pressed around an edge stiffening means 2 and a spring wire 6. Between the rectangularly bent spring wires 6′ one or more clamps 4 can be used for binding together an edge stiffening member 2 and a spring wire 6 so as is shown in FIG. 1.

In the FIG. 2, there are shown also those parts 10, 13 of a clamping head 7 which accomplish the compression of the clamp 4. Reference number 13 denotes an abutment or dolly die which has an abutment or dolly groove 15. The clamping head 7 has a swingable arm 10 with a bending groove 17 which in the compressing operation cooperates with the dolly groove 15. This will be described in more detail in the following.

FIG. 3 shows a clamping head 7, which is contained in a clamping machine for cutting off and compressing a clamp around an edge stiffening member 2 and a spring wire 6. In the figure reference numeral 8 denotes a clamping strip which in a guide slot 11 is guided forwards to the edge stiffening member 2 and there is bent to a loop 4′ around the edge stiffening member 2 and that spring wire 6 which is to be fixed to the edge stiffening member.

The clamping head 7 comprises a dolly die 13 and a movable clamping arm 10. Reference numeral 12 denotes a strip guiding body with the guiding groove 11 for the clamping strip 8. The guiding groove is shaped at its opening so to curve the clamping strip 8 to a loop 4′ as has been described above. The dolly die 13 has a dolly groove 15 for receiving in the compressing operation the clamp 4, the edge stiffening member 2 and the spring wire 6. Located under the dolly groove 15 is a tongue 14 provided for the purpose of lifting the stiffening member 2 and forming a clamping blank from the clamping strip 8.

The clamping arm 10 is swingable relatively to the dolly die 13 and has a bending and cutting die 16 with a bending groove 17 and a cutting edge 18 which cooperates with the cutting die 12′ on the strip guide 12.

When the clamping machine is in operation, the clamping strip 8 is advanced for a suitable length through the guiding groove 11 for producing a clamp blank by a cutting operation between the cutting edge 18 and the cutting die 12′ when the clamping arm 10 moves to the right in the figure. The blank clipped off from the clamping strip 8 is pressed around the edge stiffening member 2 and the spring wire 6 by means of the bending groove 17 and the dolly groove 15 when the clamping arm 10 moves towards the dolly die 13. When the working stroke is finished, the clamp 4 is pressed, as shown in FIG. 2, where spring wire and edge stiffening member are tied together.

In FIG. 3 a spring frame 1 is shown placed on a machine table 20 in which an opening 27 has been formed, through which opening the clamping head 7 sticks up above the surface level of the machine table. As is evident from the figure, the dolly die 13 is located inside of the edge stiffening member 2, within the spring frame proper. The clamping arm 10 is located outside the edge stiffening member 2 and the spring frame and projects for a distance above the machine table 20. Otherwise, the same reference numerals are used for details which have been described in the FIGS. 1 and 2.

FIG. 4 shows a machine for the clamping of spring frames which are advanced along a track in that direction which is indicated by the arrow 19. Reference numeral 21 denotes a spring frame, which has been placed onto the feeding station of the machine, from which said spring frame is transferred by a feeder 25 to a starting position for clamping. In the figure the spring frame 22 is in clamping position between two clamping units 7 and 7′. Reference numeral 26 denotes an outfeed unit, which in the figure feeds a spring frame 23 to an outfeed position. While the spring frame is displaced from the starting position 21 to the final position 23 and is advanced past the clamping heads, these heads clamp the edge stiffening member and spring wires together along the lower edge of the spring frames in the manner described above. Furthermore in the figure, reference numerals 28 and 28′ denote coils of clamping strips for the clamping heads 7 and 7′, respectively.

FIG. 5 corresponds to FIG. 4, but with the difference that the clamping units have turned so as to render the strip coils 28 visible from the side. Otherwise, the reference numerals are the same as in FIG. 4.

Figure 6:
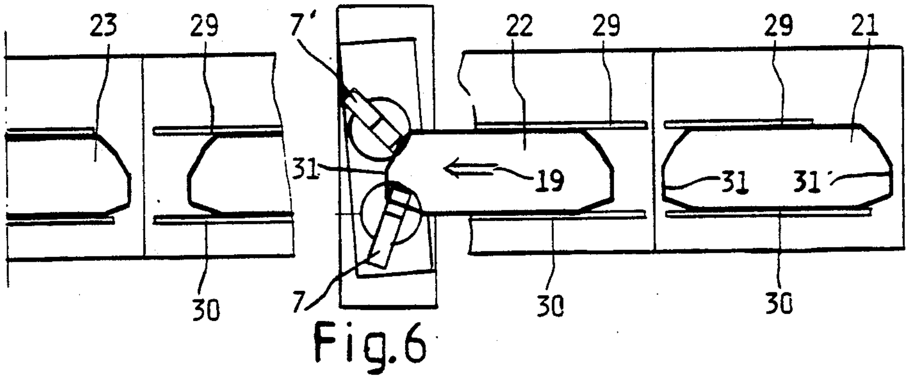
FIG. 6 is a diagrammatic sketch of a top view of the machine of FIGS. 4 and 5, FIG. 7 corresponds to FIG. 6 and shows the spring frame in an advanced position on the machine table.

FIG. 6 shows a top view of the machine of FIGS. 4 and 5. When the spring frame has been placed into the feeding position 21, the spring frame is attached to the edge stiffening member at the transversal front edge 31 or the rear edge 31′. The frame is in all positions from 21 to 23 guided under the advance feed between guiding panels 29 and 30. In the figure the front portion of the frame 22 has reached the clamping heads 7, 7'. In the figures the clamping head 7 is in working position, whereas the clamping head 7' is in a position of rest. The clamping head 7 has been swung into such a position that it is rectangular towards the oblique edge adjacent the front edge 31 of the spring frame 22. While the spring frame is advanced in the direction of the arrow 19, the clamping heads adjust their position so as initially to follow the oblique edges and thereupon the longitudinally extending edges of the frame.

Figure 7:
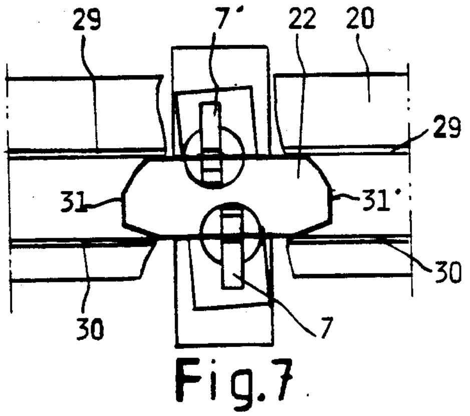

In FIG. 7 the frame 22 has been advanced for a further distance from the position shown in the FIG. 6 and the clamping heads 7, 7' are operative along the longitudinal sides of the spring frame.

Figure 8:
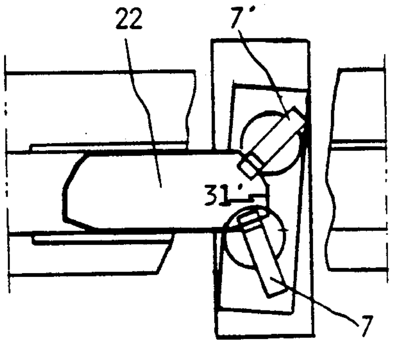
FIG. 8 shows the spring frame advanced for some distance.

FIG. 8 shows the positions of the clamping heads 7, 7' when clamping the oblique edges at the end portion 31' of the spring frame 22 in a corresponding manner as has been shown in the FIG. 6 for the clamping of the front edge portion 31 of the frame.

Figure 9:
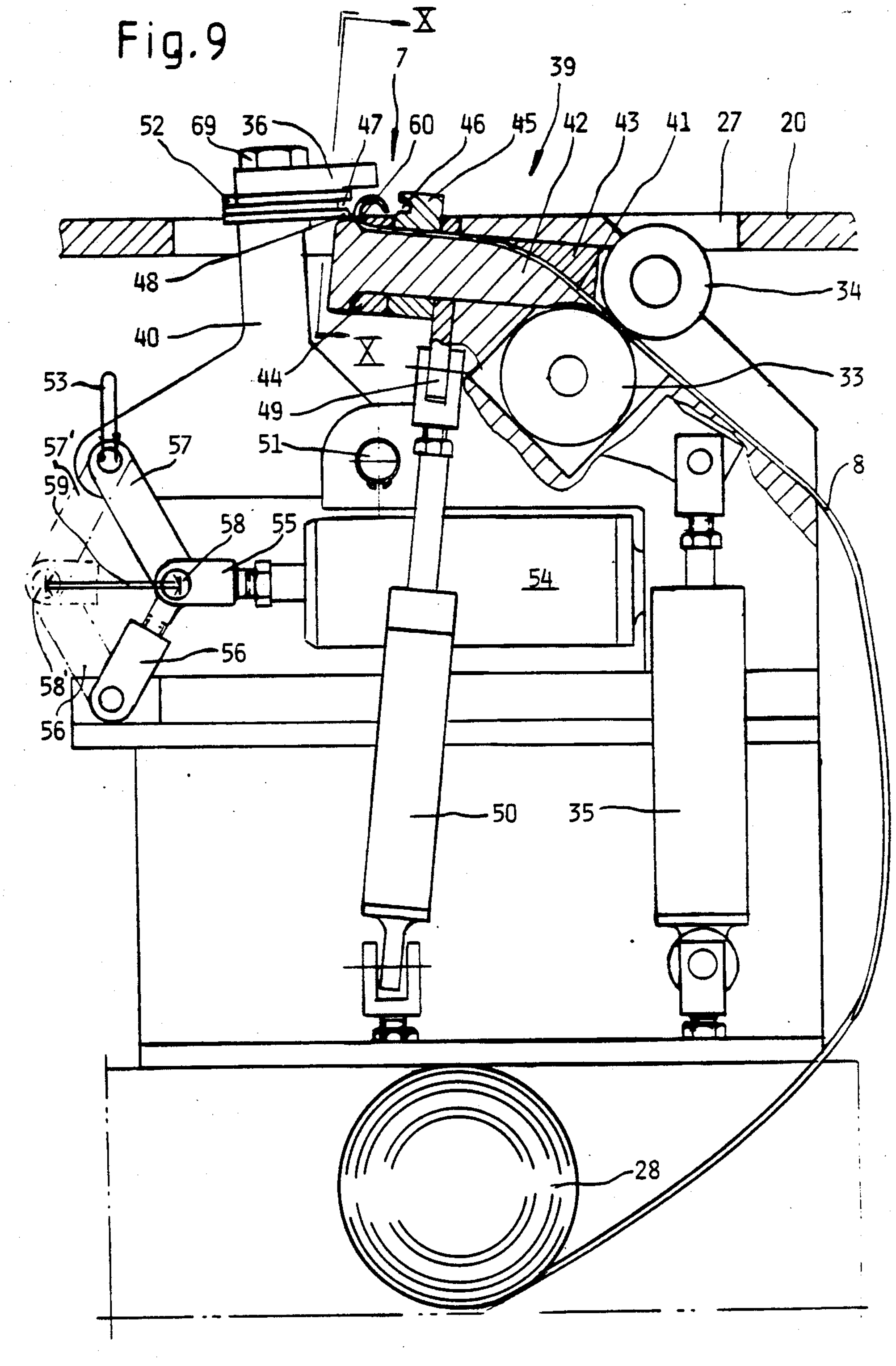
FIG. 9 is a sectioned side view of a clamping head.

FIG. 9 shows a clamping machine in more detail. 37 denotes the clamping head of the machine, and 39 denotes the dolly part of the clamping machine. 38 is a clamping strip, which is fed forwards by means of a ratchet-wheel 33, against which the clamping strip is pressed by a dolly roll 34. The ratchetwheel 33 is driven by a feeding cylinder 35, the stroke of which is adjusted so as to cause it to advance such a length of the clamping strip as is required for one clamp. The clamping strip 38 is discharged from a bobbin shown diagrammatically in the figure and denominated 48.

The guiding groove 41 in the strip conductor 42 has been provided by milling a groove downwards from the surface of the strip conductor so as to accomplish a softly rounded bottom. Thereafter a bottom filling bit 43 has been fixed at such a distance from the bottom that the clamping strip 38 can be fed with sufficient play to the cutting and bending die of the machine. Reference numeral 44 denotes a cutting die in the shape of a ring which is mounted rotatably on the strip conductor 42. The cutting die presents flat levels with cutting edges and will be described nearer more below.

Rotatably mounted on the strip conductor 42 is also a stopping disc 45 with bending grooves 46 for the bending of the clamp. The stopping disc 45 is rotatably connected with an arm 49 which can be swung by means of an operating cylinder 50 in a manner which will be described more below. The clamping head 37 comprises a cutting and bending die 52 with a bending groove 47 and a cutting edge 48. The cutting and bending die 52 is together with a backing disc 36 fixed on a clamping arm 40 by means of a bult 69, which arm is swingable about a pivot pin 51. When the clamping arm 40 performs a movement to the right in the figure, a blank will be cut off from the clamping strip 38 by the cutting edge 48 and the cutting die 44. By means of the bending grooves 47 on the clamping arm 40 and the co-operating bending grooves 46 on the dolly part 39 and the backing disc 36 the strip is bent around an edge stiffening member and a spring wire in the manner described in connection with the FIG. 2.

The clamping arm 40 performs a swinging working movement and returns to its position of rest. The swinging movement has been denoted by an arrow 53 and is accomplished by the movement of two toggle link units 56, 57, the common pivot pin 58 of which is connected with the end of a piston rod 55 of a cylinder 54 and performs a reciprocating motion indicated by the arrow 59. The figure shows the piston rod 55 in the innermost position. In the outermost position of the piston rod the pivot pin and the toggle link units take the positions 58', 56' and 57', respectively. The clamping arm 40 occupies the same position in the two end positions 58 and 58', respectively, after having performed a reciprocating working stroke. This implies that the clamping arm 40 performs two complete working strokes while the piston rod 55 performs a cycle, i.e. from the innermost position 58 of the pivot pin to the outermost position 58' thereof and back to the starting position. This implies that the clamping machine can work with high velocity.

Figure 10:
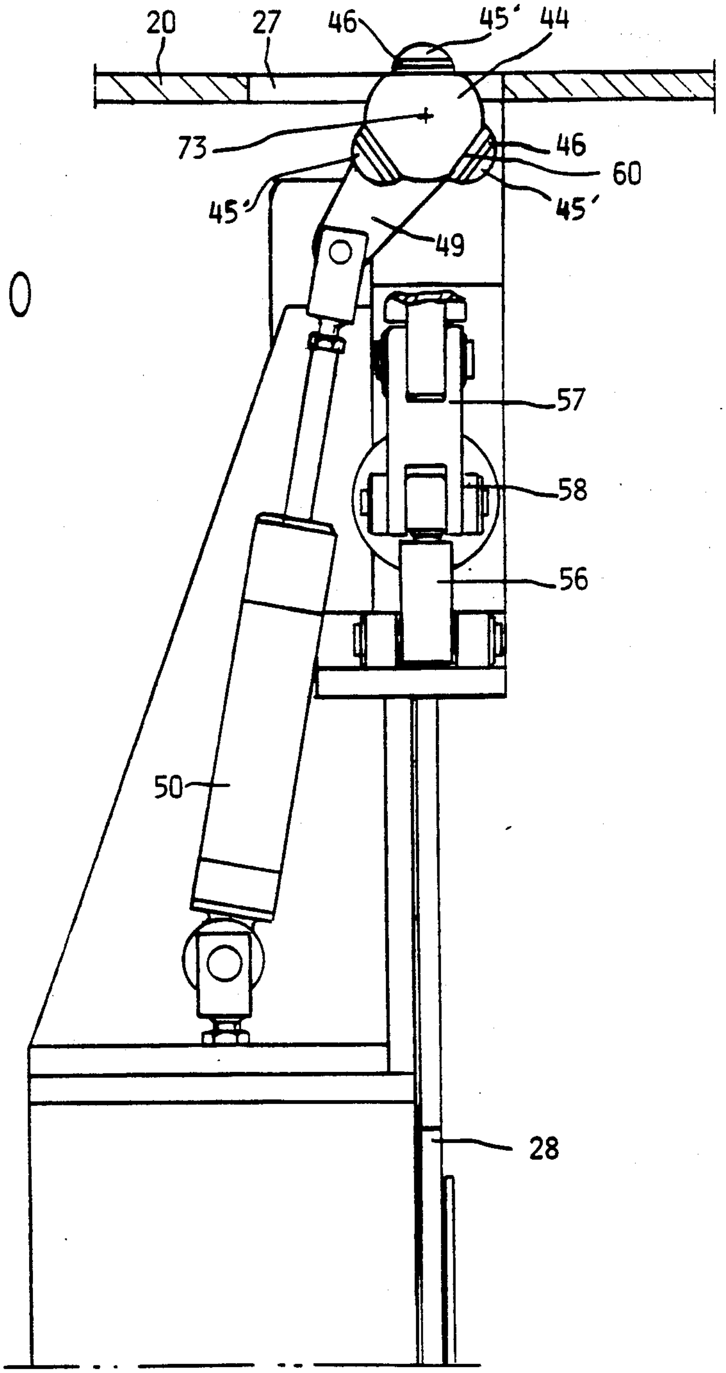
FIG. 10 is a view following line X—X in FIG. 9 on a minor scale.

FIG. 10 is a view shown in the direction indicated in the FIG. 9 by X—X. The figure shows the operating cylinder 50 for rotation of the stopping disc with the bending grooves 46. The stopping disc shown in the figure has three projecting abutment portions 45'. Shown in the figure is also the cutting die 44 located ahead of the stopping disc and having three cutting borders 60 which constitute cutting edges shaped for cooperation with the cutting edges 48 on the clamping arm 40.

Figure 11:
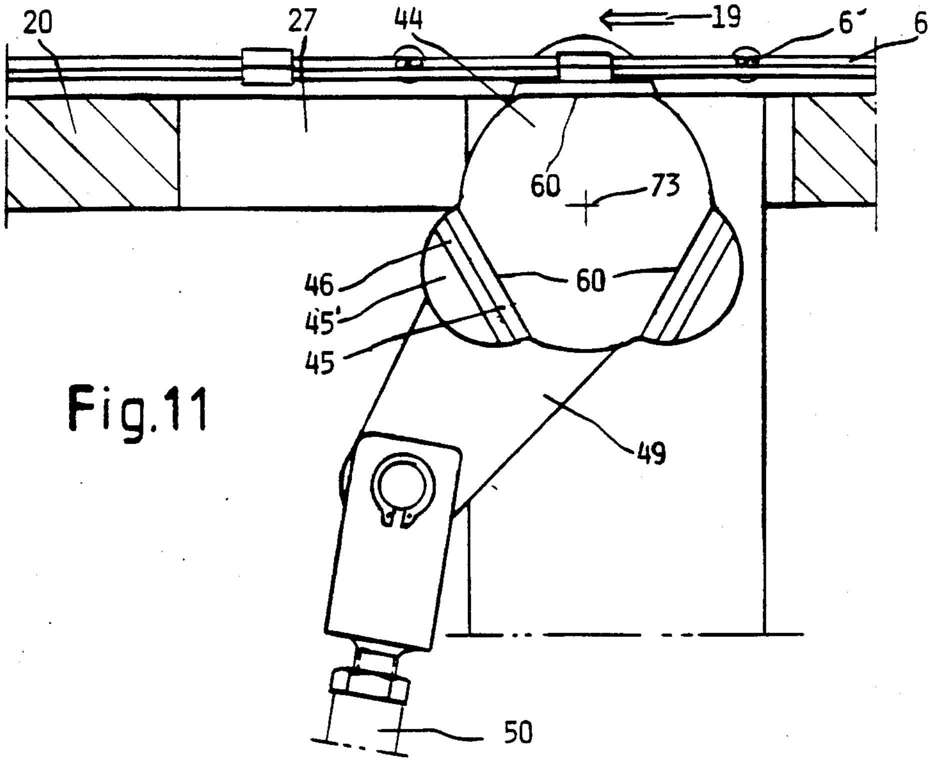
FIG. 11 shows a detail of FIG. 10 on a larger scale with the parts in the working position of the machine.

In FIG. 11 the rotatable dolly unit is shown on a larger scale. The stopping disc 45, the bending grooves 46, the cutting die 44 with the cutting edges 60 are visible here more clearly. The figure shows also the aparture 27 in the machine table 20, over the surface of which the abutment part 45' projects thereby that the carrier arm 49 is conducted obliquely downwards by the operating cylinder 50. The FIG. 11 thus shows the stopping disc 45 in working position, i.e. in the position for cooperation with the cutting and bending parts 48, 47 and 36 on the clamping head 37 shown in FIG. 9 during a clamping operation.

Figure 12:
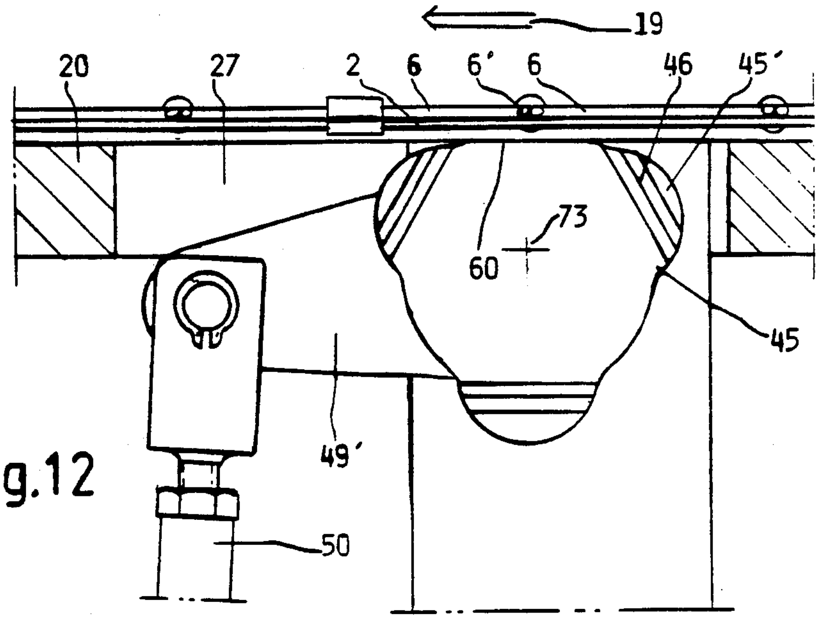
FIG. 12 shows the same details as FIG. 11 but with the parts in the rest position of the machine.

FIG. 12 corresponds to the FIG. 11, but shows the stopping disc 45 in the position of rest as described earlier, i.e. when no clamping operation is in progress while the spring frame is displaced in the direction of movement indicated by the arrow 19. Hereunder the crossing spring wires 6' can be pushed without any obstacle past the stopping disc 45' along the machine table 20. In the position of rest the swingable arm for the stopping disc occupies the position 49' into which it has been conveyed by the cylinder 50. As the stopping disc 45 and the arm 49, which is swung between the operative position 49 and the position of rest 49' by the cylinder 50, are very small and light, the change between the position of operation and the position of rest can be effected very rapidly.

FIG. 13 shows diagrammatically how the clamping head 7 is fixed onto a stand 61 which also supports the coil 48 of clamping strip. The stand 61 and the parts carried by the stand are swingable about a hinge member 62 in a manner which shall be described later on.

FIG. 14 shows the parts of FIG. 13 viewed in the direction XIV—XIV. The figure shows how the coil 48 of the clamping strip 38 rests of support pulleys 64 for the purpose of facilitating the rotation of the coil 48 in the discharge of the clamping strip 38. Visible on a minor scale are in the upper part the earlier described details, viz. the clamping head 37, the dolly unit 39, the clamping arm 40, the toggle link units 56 and 57 and the cylinder 54. In this embodiment the hinge bearing is constituted by a roller path bearing 62'.

FIG. 15 shows how two stands 61 and 61' with the clamping heads 7 and 7' respectively, are interconnected for swinging motion by means of hinge members 62 and 62', which are carried by fixing plates 65 and 65'.

The two fixing plates 65 and 65' are displaceably mounted on a base plate 66 so as to be displaceable according to the arrows 74, 74' radially inwards or outwards from a hinge link 67, about which the base plate 66 can perform a swinging movement, as is indicated by the arrow 68. In this way the device according to the FIG. 15 becomes capable to guide the clamping heads 7, 7' into the positions which are shown in the FIGS. 6-8. The displacements 74, 74' of the fixing plates 65, 65' on the base plate 66 and the swinging motion 68 of the base plate 68 can be effected by means of cylinders which together with the other cylinders can be governed by a central control unit.

FIG. 16 shows an embodiment of the upper part of a clamping arm with the reference numerals denoting the same parts as in FIG. 9.

FIG. 17 shows, partly in section, a view following line XVII—XVII in FIG. 16. The cutting and bending die 52 is constructed with three bending grooves and cutting edges, denoted 47 and 48, respectively. By loosening the fixing bolt 69 and rotating the cutting and bending die 52 by 120° there is obtained a new part for cooperation with corresponding parts of the dolly unit 39, the cutting die 44 and the stopping disc 45. Of course, it is also possible to have more or less cooperating parts. Likewise, the bending grooves may be formed in pairs with between them differing dimensions for clamping by means of differently dimensioned clamping strips, having, for example, widths of 6 or 10 mms and different thickness.

It is also conceivable to construct a strip guider 42 having a plurality of guiding grooves 41, such as, for example, for strips of 6 mms and 10 mms and turning the strip guider so as to advance a desired strip to become cut and bent. It is possible also to cause a power means to turn the strip guider 42 as well as the cutting and bending die 52 of FIG. 16 so as to make possible to obtain a wholly automated clamping operation for different dimensions of clamping strips, edge stiffening members, spring wires etc.

Figure 18:
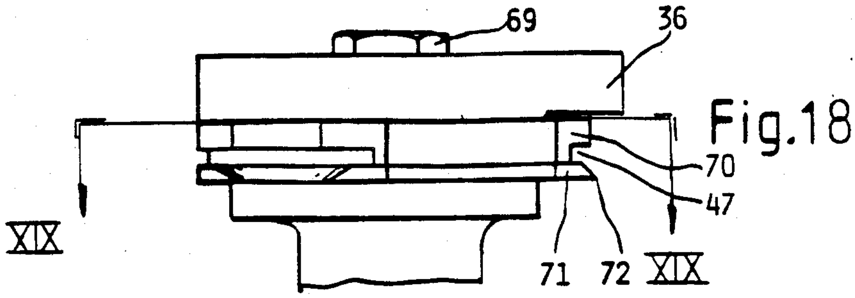
FIG. 18 shows the end of another embodiment of a clamping arm.

FIG. 18 shows a clamping arm, the cutting and bending die of which is composed of several separate parts, viz. a support plate 36, a bending die 70, a cutting die 71 with cutting edge 72. All parts are kept together by a fixing bolt 69.

Figure 19:
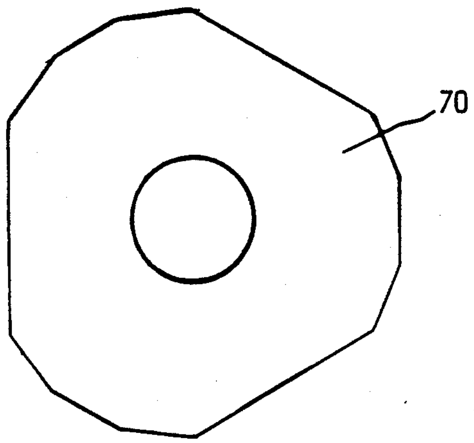
FIG. 19 is a view following line XIX—XIX in FIG. 18, FIGS. 20 and 21 show two parts belonging to the clamping arm.

FIG. 19 shows that the bending die 70 and the cutting die 71 are shaped substantially as a polygon with six sides. It is possible, of course, to make use of a shape presenting a greater or minor number of sides.

Figure 20:
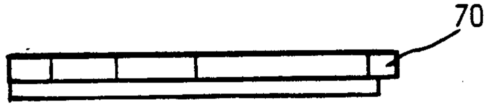
Figure 21:
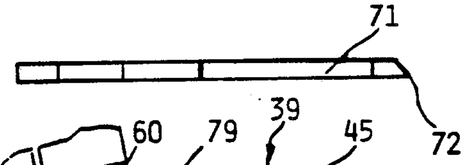

FIG. 20 shows the bending die 70, whereas FIG. 21 shows the cutting die 71 with the cutting edge 72. The bending die 70 and the cutting die 71 form together a bending groove 47 as is evident from the FIG. 18.

Figure 22:
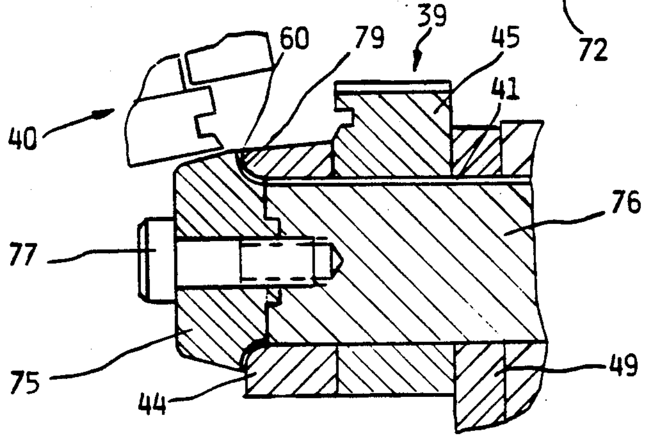
FIG. 22 is a section through an embodiment of a dolly unit.

FIG. 22 shows a dolly unit composed of a plurality of assembled parts. In this way great advantages are obtained thereby that those parts which are subjected to wear easily can be detached for exchange or service. In the figure, which corresponds to a portion of FIG. 9, the reference numeral 40 denotes the clamping arm, 45 the stopping disc and 49 the swivel arm thereof, while 44 is the cutting die. The strip conductor 42 in FIG. 9 has been replaced in the shown embodiment by a central strip conductor body 76, to which a forming head 75 is secured by means of a bolt 77. By loosening and detaching the bolt 77 the detail parts 45, 49, 44 and the forming head 75 can be removed without necessitating any action concerning other parts of the machine. It is easy, for example, to remove the forming head 75 for sharpening the cutting edge 60 of the cutting die 44.

The forming head 75 constitutes together with the cutting die 44 a bending groove 79 for bending of the clamping strip round so as is shown in FIG. 9. Several bending grooves can be provided along the circumference and dimensioned for different dimensions of clamping strips. The radii may be different, whereby a great number of clamping blanks having different shapes and dimensions can be produced in a very simple manner without necessitating any great changes in the machine.

Figure 23:
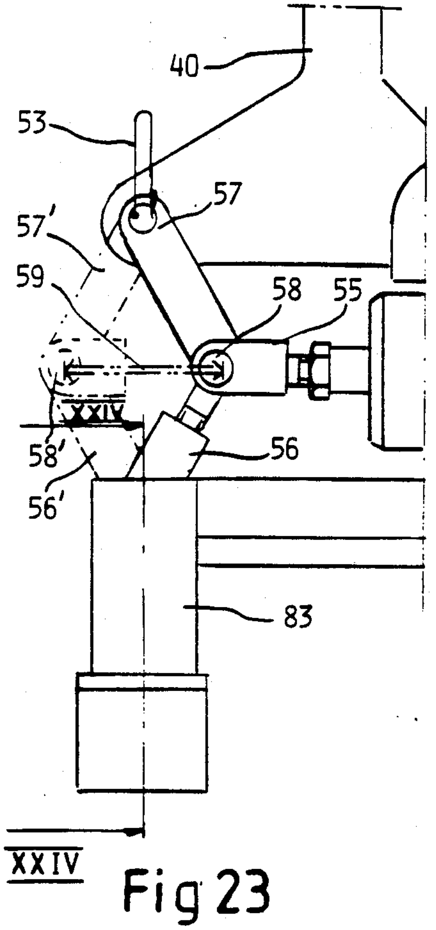
FIG. 23 shows an alternative driving mechanism.

FIG. 23 shows a spring unit 83 to which the lower toggle joint 56 is pivotably attached. If the arm 40 is blocked in any way there will be very high forces acting on the toggle joint 56, 57, 58. To avoid this the toggle joint can be yieldingly pressed into the spring unit, depictured in more detail in FIG. 24.

Figure 24:
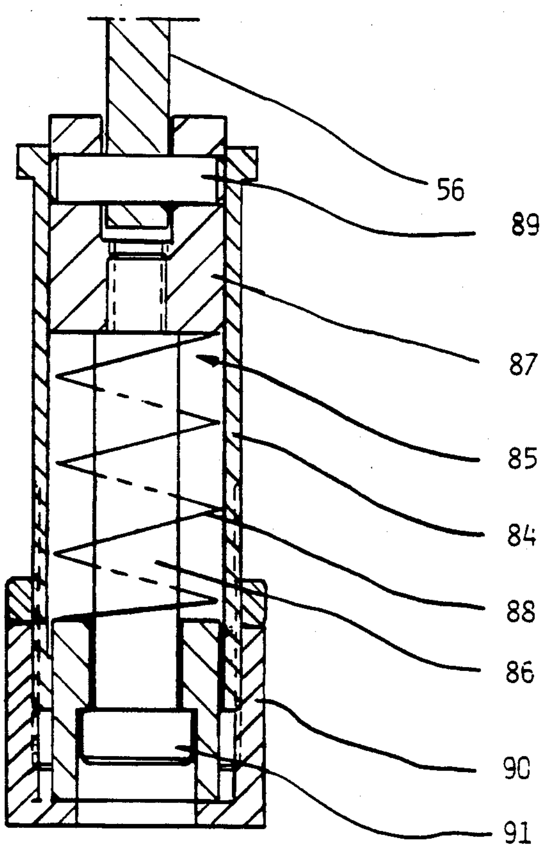
FIG. 24 is a section on XXIV—XXIV in FIG. 23.

FIG. 24 indicates a spring housing 84 in which a plunger 85 comprising a bolt 86 and a cross head 87 is displacable under the action of a biased spring 88. The cross head carries a pin link 89 for the toggle joint 56. The head 91 of the bolt 86 rests on a shoulder of the adjusting nut 90. By turning the adjusting nut 90 the position of the link pin 89 may be changed. When the arm 40 is blocked the toggle link 56 will press the pin 89 and the cross head 87 downwards against the action of the spring 88. In this way the mechanism will not be damaged.

Figure 25:
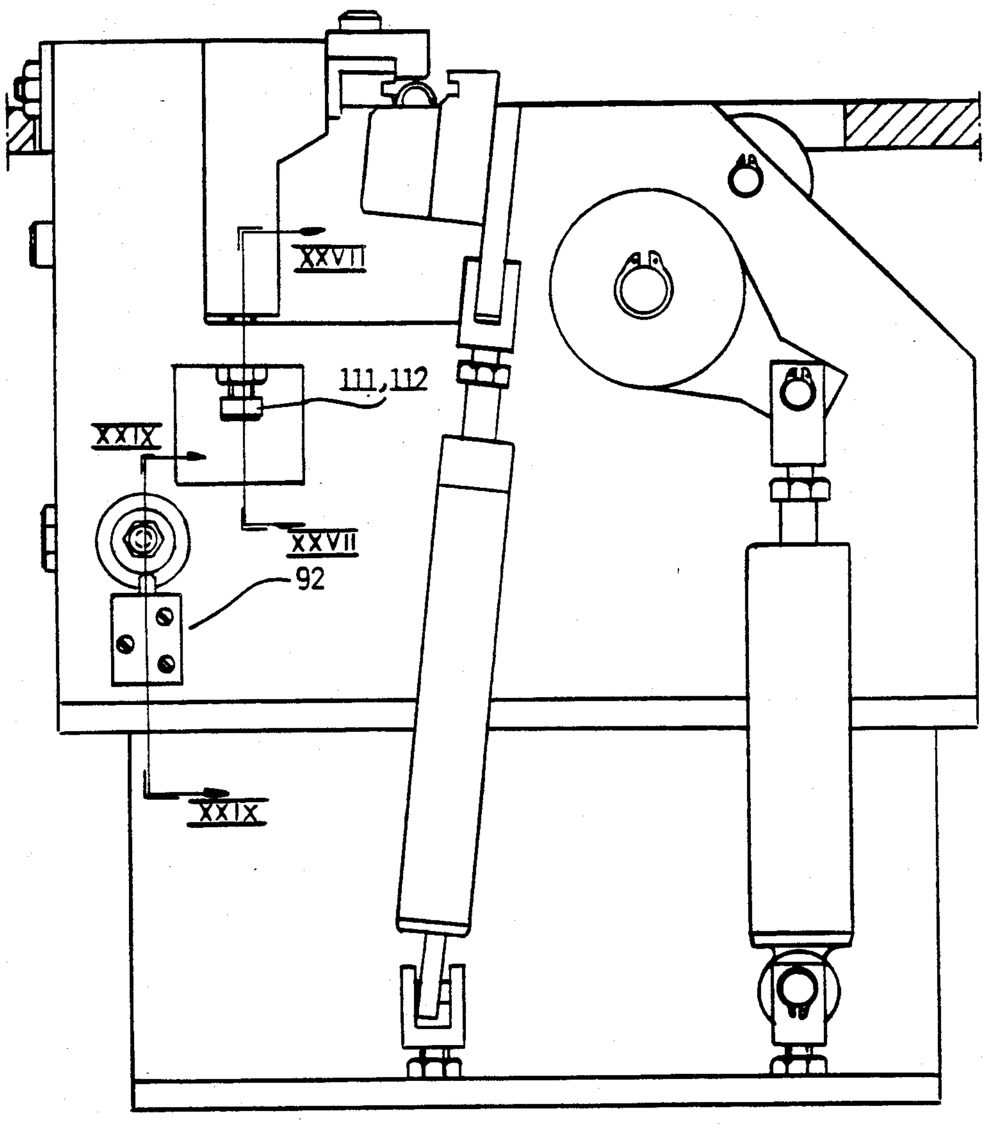
FIG. 25 is a side elevation of a hydraulic driving mechanism.

In the embodiment according to FIG. 25 there are no toggle joints for the cutting and bending operations and thus there are no accident risk for the operator. The operation is carried out by hydraulical components pneumatically controlled as will be described referring to FIG. 26. In FIG. 25 a hydraulically controlled pneumatic reversing valve is denoted by 92 and an adjusting means for the cutting operation is denoted by 93.

Figure 26:
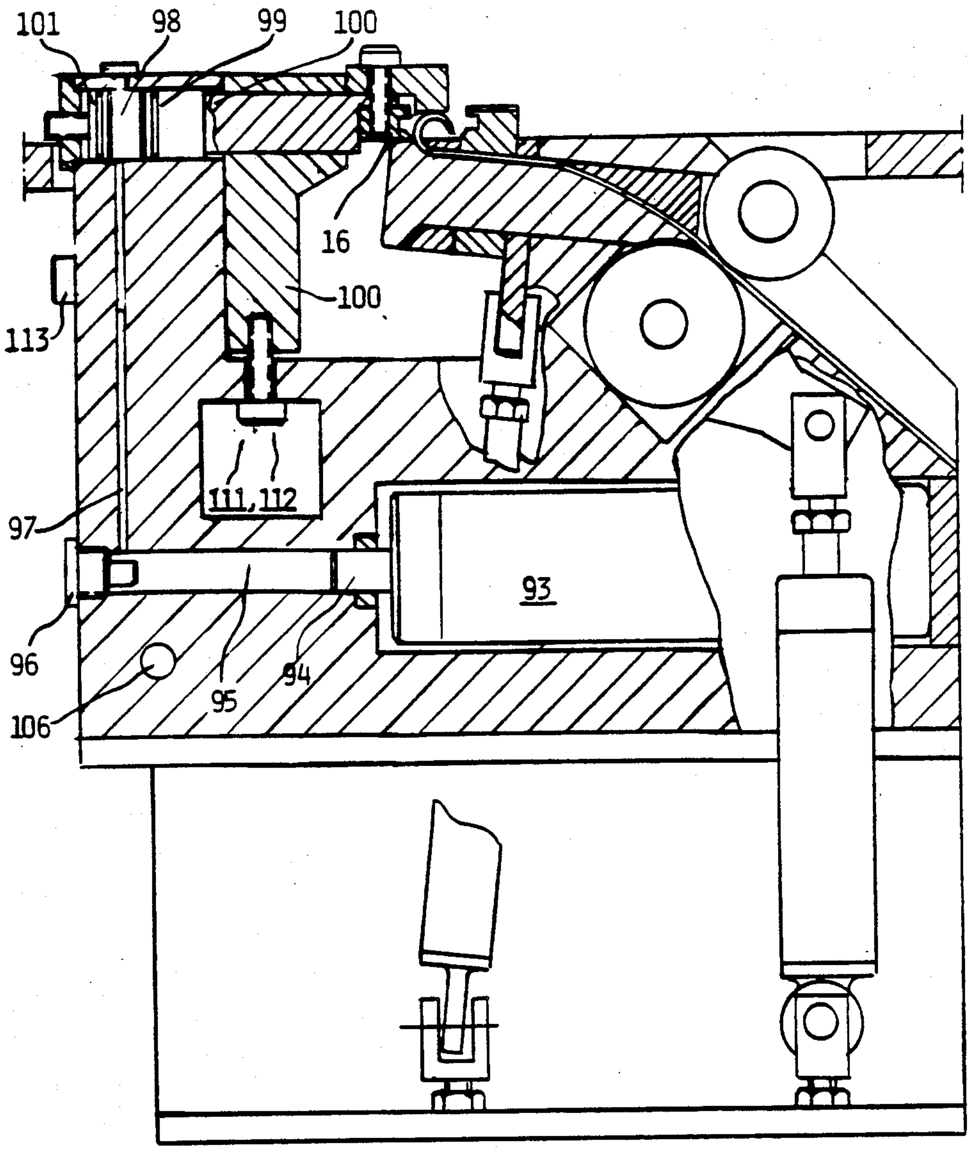
FIG. 26 is a section of the hydraulic mechanism shown in FIG. 25.

FIG. 26 is a section showing a pneumatic cylinder 93 having a piston 94 in a boring 95 filled with hydraulic fluid and closed by a stop bolt 96 limiting the stroke of the piston 94. The hydraulic pressure in the cylinder bore 95 is transferred through a conduit 97 to a cylinder bore 98 with a piston 99 abutting a reciprocating support 100 for a cutting die 16. At the rear end of the cylinder bore 98 there is a set plunger 101 by means of which the starting position of the piston 99 may be axially adjusted to set the position of the reciprocating support 100 to a correct position for the operation of the cutting die 16. The reciprocating support 100 is transversely displacable relative to the piston 99 as will be described referring to FIG. 27 and 28. The further parts in FIG. 26 are similar to the ones shown in FIG. 9.

Figure 27:
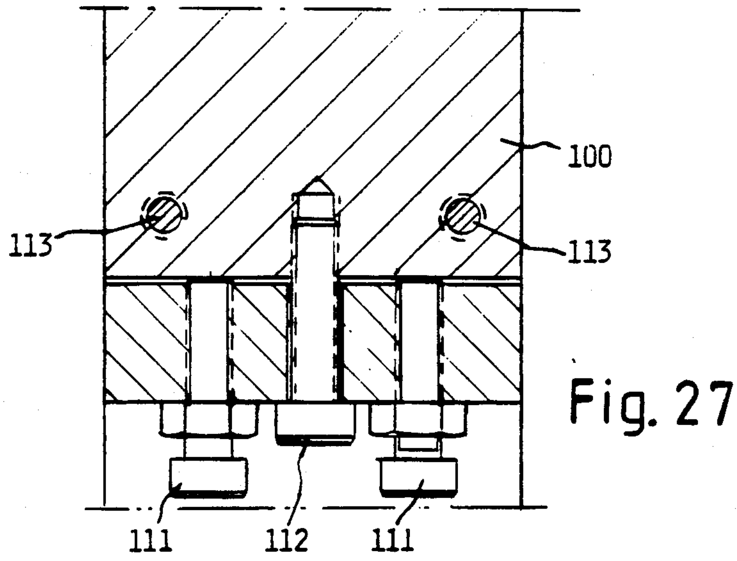
FIG. 27 is a partly sectioned view according to the arrow XXVII in FIG. 26.

FIG. 27 is a section on XXVII—XXVII in FIGS. 25 and 26. The support 100 may be displaced upwards-downwards by means of a set of three bolts, two pushing bolts 111 and one pulling bolt 112, the bolts being threaded as shown in the figure. The nip of the cutting edges at 16 may be adjusted very accurately for good operation. In the adjusted position the support 100 may be further fixed by bolts 113 shown in FIGS. 26 and 27.

Figure 28:
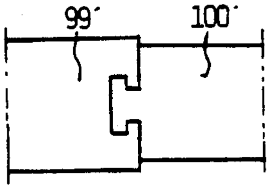
FIG. 28 is a section on XXVIII—XXVIII in FIG. 26.

FIG. 28 shows how the support 100' is displacably connected to the piston 99' by a T-slot, such that the support will follow the axial movement of the piston 99' but can be displaced transversely relative to the piston.

Figure 29:
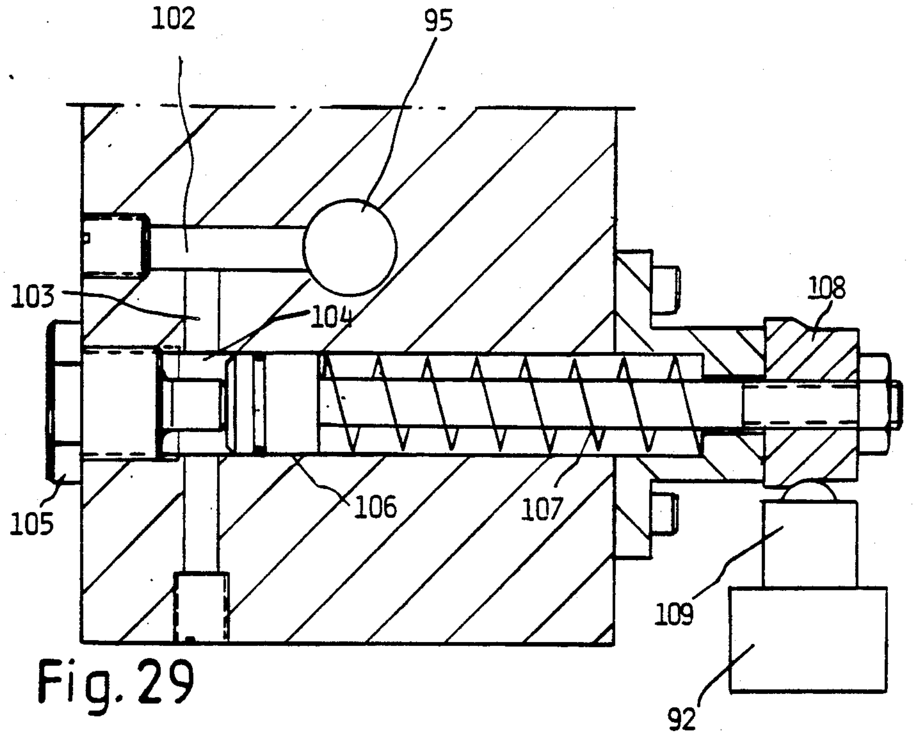
FIG. 29 is a section of a reversing valve controlling the operation of the hydraulic driving mechanism.

FIG. 29 is a section on XXIX—XXIX in FIG. 25. The cylinder bore 95—c.f. FIG. 26—is connected with a cylinder bore 104 by conduits 102 and 103. The left end of the cylinder bore 104 is closed by a threaded stop 105 for a piston 106 biased against the stop by a spring 107. At the end of the piston rod of the piston 106 there is a cam 108 acting on a push rod 109 of a reversing valve 92 controlling the pneumatic cylinder 93. When pneumatic pressure is fed to the cylinder 93 via the reversing valve 92 the piston 94 is pushed forwards into the cylinder bore 95, hydraulic pressure is fed through conduits 102, 103 and cylinder bore 104 to act on piston 106. When the pressure reaches a predetermined value, being sufficient to cut and bend a clamp, the piston 106 and the cam 108 move to the right in the figure, pressing the push rod 109 downwards and causing the reversing valve 92 to reverse the pneumatic flow and pressure of the pneumatic cylinder 93 such that the cylinder quickly retracts the piston 94 thereby causing the cutting die 16 to return to its starting position. The only "open" moving part is the reciprocating support 100. If desirable it is easy to put a small cover above the die 16 to prevent all casualty risks for the operator.

Hereinbefore, several different embodiments of the invention have been described for the purpose of exemplification. An expert in the art is, however, capable of modifying the invention in many respects within the scope of the subsequent claims.

I claim:

1. A device in a clamping machine for clamping edge stiffening means or bars (2), longitudinal and transverse spring wires (6, 6') and further elements of a spiral spring cushion (1), adapted to form a bed bottom, a seat or back cushion for a car seat or the like, said machine comprising a machine table (20) supporting the spring cushion, clamping heads (37) disposed at the surface of the table for cutting off a blank from a clamping rolled strip (38) and bending the blank around said edge stiffening means and said wires (6, 6'), the improvement wherein said clamping head (37) has a reciprocating clamping puncher located outside said spring cushion (1) and comprising a cutting edge (48) and a bending die (52) with at least one groove (47) for receiving said clamping strip blank, said edge stiffening means (2) and said wire (6), a dolly part (39) cooperating with a reciprocating puncher (40) and comprising;

a clamping die (44) cooperating with a cutting edge (48) of the reciprocating clamping puncher (40), a dolly die (45) having at least one groove (46) for receiving clamping strip blank material, edge stiffening means (2) and wire (6), devised for cooperation with said at least one groove (47) on the clamping puncher to cut off a clamping blank portion and to form a clamp around the edge stiffening means (2) and the wire (6) when bringing the clamping puncher together with or in contact with the dolly die (45), said dolly die (45) being shaped such that the portion carrying said at least one groove 46 for taking up the clamping strip material, edge stiffening means (2) and wire (6) in operative position for clamping, projects upwards above the surface of the machine table (20) while said portion in its inactive position is located below the surface of the table (20) in order to render possible displacement (19) of the spring cushion (1) in the direction of the edge stiffening means (2) without any obstruction by the transversely extending wires (6').

2. A device according to claim 1, wherein the reciprocating clamping head comprises a clamping arm (40) adapted to pivot on a horizontal axle (51) and having a free end carrying the clamping die (52), the pivoting movement of the clamping arm being accomplished by a two link (56, 57) toggle mechanism having a common hinge (58) and two links actuated by a reciprocating power means (54), the two toggle links (56, 57) having other respective ends (56", 57") pivotably carried (56") by the machine table (20) and by a pivot pin (57") attached to the clamping arm (40) at some distance from the horizontal axle (51) such that the clamping arm (40) performs a complete operating cycle at a one-way full stroke of the reciprocating power means (54).

3. A device according to claim 1, wherein the dolly die (45) is constituted by a horizontal stopping disk rotatable on an axle which is perpendicular to the axle (51) of the clamping arm (40).

4. A device according to claim 3, wherein the stopping disk has a triangular shape with rounded corner portions (45') and bending grooves (46) formed in the rounded corner portions (45') and extending perpendicularly to the radius from a rotation axle (73) of said stopping disk.

5. A device according to claim 1, wherein at least a front portion of the clamping strip guider (42) is formed as a round pivot which constitutes a bearing for rotational movement (49–49') of the stopping disk.

6. A device according to claim 1, wherein the clamping strip guider (42) has a radial guiding groove (41) with a smoothly rounded bottom and a bottom filling part (43) cooperating with the radial guiding groove and formed such that a duct (41) lies within the clamping strip guider for advancing the clamping strip (38) up to a cutting die (44) for forming and cutting a clamping blank.

7. A device according to claim 6, wherein the cutting die (44) is shaped as a ring rotatable on the front portion of the clamping strip guider (42) and having at least one cutting edge (60) located at the periphery of said ring.

8. A device according to claim 7, wherein the cutting die (44) is rotatable about an axis of rotation and has at least one even portion parallel to said axis of rotation (73), and a flat nosed or levelled surface (60), for cooperation with a straight edge (48) on the arm (40) of the clamping head (37).

9. A device according to claim 3, wherein the stopping disk is rigidly connected to a carrier arm (49) by means of which the stopping disc (45) is rotatable (49, 49') between an operating position and an idle position by power means (50).

10. A device according to claim 1, wherein the bending die (52) of the clamping head has the shape of a ring rotatable on an axis perpendicular to the reciprocating movement of the clamping head, and at least one groove (47) being arranged along the periphery of the ring for cooperation with said at least one groove (46) of the dolly unit (39) for producing a clamp (4).

11. A device according to claim 3, wherein said at least one groove (46) of the rotatable stopping disc and said at least one groove (47) of the rotatable bending die (52) are plural grooves having different dimensions, but formed so as to be equal in pairs for rendering a clamping operation possible.

12. A device according to claim 1, wherein the clamping head as a whole is turnable together with the winding bobbin (48) for the clamping strip (38) about vertical axes for adaption to oblique edges (31—31') of the longitudinal sides of the spring cushion.

13. A device according to claim 12, wherein said clamping heads are two clamping heads (7, 7') disposed individually rotatable (80, 80') at each one end of a balance arm (66) which arm (66) is swingable about an axle (67) located between the clamping heads (7, 7') and parallel to axles (62, 62') of rotation of the clamping heads.

14. A device according to claim 12, wherein the axles (62, 62') for the swinging movements of the clamping heads (7, 7') are fixed each on its own holding disc (65, 65') which in turn is displacable radially (74, 74') along the balance arm (66) relatively to the axle for the swinging movement of the balance arm (66).

15. A device according to claim 1, wherein the dolly unit (39) includes a strip guider (76) with a front portion to which a turnable cutting die (44) and a rotatable forming head (75) are attached by means of a bolt (77).

16. A device according to claim 15, wherein the cutting die (44) and the rotatable forming head (75) form guiding grooves (41) along the periphery for clamping strips (38) of different dimensions.

17. A device according to claim 15, wherein the guiding grooves (41) at their opening have circular bending grooves (79) of different radii.

18. A device according to claim 2, wherein said two link toggle mechanism (56) has a link end pivot (56") joined with a spring (88) biased plunger (85) enclosed in a housing (84) fixed to the machine table (20) such that said link end pivot (56") is allowed to move into the spring housing unit upon clamping arm (40) being blocked, thereby avoiding destruction of the clamping mechanism.

19. A device according claim 1, wherein the reciprocating clamping puncher comprises a cutting die (16) fixed to a reciprocating support (100) displacably carried by a housing (110) and actuated by a hydraulic piston (99) in a cylinder bore (98) connected by a conduit (97) to a cylinder bore (95) with a piston (94) driven by a pneumatic cylinder (93) such that a stroke of the cylinder (93) presses the plunger forward to cut off a strip blank to form a clamp.

20. A device according to claim 19, wherein a set plunger (101) is arranged at the end of the cylinder bore (98) for the hydraulic piston (99) of the reciprocating support (100), and said set plunger being axially displacable to set the starting position of the working stroke.

21. A device according to claim 19, wherein the housing (110) of the reciprocating support (100) is adjustable transversely to the cutting edge (16) motion in order to adjust the cutting nip at the edge (16).

22. A device according to claim 21, wherein the reciprocating support (100) has a T-shaped head (100') adopted and guided by a related undercut slot (99') in the piston (99) of the reciprocating support (100).

23. A device according to claim 19, wherein a reversing valve (92) for a pneumatic power means (93) is controlled by a spring (107) biased piston (106) and cam unit (108) actuated by the hydraulic pressure acting on the piston (99) of the reciprocating support (100) whereby the cam (108) operates the reversing valve (92) when a predetermined hydraulic pressure is at hand in the cylinder (95) of the reciprocating support (100), thereby causing the pneumatic power means (93) to reverse very quickly.

* * * * *